United States Patent
Koch et al.

(10) Patent No.: US 11,436,611 B2
(45) Date of Patent: Sep. 6, 2022

(54) PROPERTY ARCHIVIST ENABLED CUSTOMER SERVICE

(71) Applicant: AT&T Intellectual Property I, L.P., Atlanta, GA (US)

(72) Inventors: Robert Koch, Peachtree Corners, GA (US); Nikhil Marathe, Palatine, IL (US); James Pratt, Round Rock, TX (US); Ari Craine, Marietta, GA (US); Eric Zavesky, Austin, TX (US); Timothy Innes, Atlanta, GA (US); Nigel Bradley, Canton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 335 days.

(21) Appl. No.: 16/712,086

(22) Filed: Dec. 12, 2019

(65) Prior Publication Data
US 2021/0182867 A1    Jun. 17, 2021

(51) Int. Cl.
*G06F 15/16* (2006.01)
*G06Q 30/00* (2012.01)
(Continued)

(52) U.S. Cl.
CPC ........... *G06Q 30/016* (2013.01); *G06V 20/58* (2022.01); *H04L 67/10* (2013.01); *H04L 67/306* (2013.01);
(Continued)

(58) Field of Classification Search
CPC .... G06Q 30/016; G06K 9/00805; G06K 9/62; H04L 67/10; H04L 67/306; H04L 67/12;
(Continued)

(56) References Cited

U.S. PATENT DOCUMENTS

| 8,284,059 B2 | 10/2012 | Ross |
| 8,319,607 B2 | 11/2012 | Grimlund et al. |

(Continued)

FOREIGN PATENT DOCUMENTS

| CN | 109818793 A | * | 5/2019 |
| EP | 3295390 A1 | | 3/2018 |

(Continued)

OTHER PUBLICATIONS

Patru et al.; "Smart Home IoT System"; IEEE 15th RoEduNet Conf.: Networking in Education and Research; 2016; 6 pages.
(Continued)

*Primary Examiner* — Nicholas R Taylor
*Assistant Examiner* — Thorne E Waugh
(74) *Attorney, Agent, or Firm* — Guntin & Gust, PLC; John G. Rauch

(57) ABSTRACT

Methods, systems, and apparatuses may be used to create a property archivist that can enable automated customer service, in which an electronic inventory may be automatically generated and used to assist in resolving customer service needs. In an example, an apparatus may include a processor and a memory coupled with the processor that effectuates operations. The operations may include detecting a product; based on the detection, adding the product to a property archive, wherein the property archive comprises a profile for plurality of products at a location; obtaining an indication of a problem with the product; based on the detected problem, initiating a service request for the product; automatically diagnosing the problem to determine a resolution; and based on the determined resolution, automatically purchasing a part of the product and shipping the part for the product to a location of the product.

20 Claims, 4 Drawing Sheets

(51) Int. Cl.
*H04W 4/029* (2018.01)
*H04L 67/306* (2022.01)
*H04W 4/02* (2018.01)
*H04L 67/10* (2022.01)
*H04W 12/06* (2021.01)
*G06V 20/58* (2022.01)

(52) U.S. Cl.
CPC ............ *H04W 4/023* (2013.01); *H04W 4/029* (2018.02); *H04W 12/06* (2013.01)

(58) Field of Classification Search
CPC ..... H04W 4/023; H04W 4/029; H04W 12/06; H04W 4/70; G06V 20/58
See application file for complete search history.

(56) References Cited

U.S. PATENT DOCUMENTS

| | | | |
|---|---|---|---|
| 8,442,844 B1* | 5/2013 | Trandal | G06Q 30/012 705/35 |
| 9,420,044 B2* | 8/2016 | Gupta | H04L 67/12 |
| 9,680,726 B2 | 6/2017 | Sharma et al. | |
| 9,699,659 B2 | 7/2017 | Zehavi et al. | |
| 9,756,131 B2 | 9/2017 | Zuerner | |
| 9,853,826 B2 | 12/2017 | Shuman et al. | |
| 9,866,697 B2* | 1/2018 | Stepanian | H04N 21/47214 |
| 9,894,159 B2 | 2/2018 | Chen et al. | |
| 9,955,526 B1 | 4/2018 | Yu | |
| 10,049,365 B2 | 8/2018 | Davis et al. | |
| 10,064,059 B1 | 8/2018 | Yu | |
| 10,178,530 B2* | 1/2019 | Forood | H04W 4/38 |
| 10,182,043 B2 | 1/2019 | Gu | |
| 10,229,394 B1* | 3/2019 | Davis | H04L 41/5074 |
| 10,405,150 B2 | 9/2019 | Aiuto et al. | |
| 10,439,913 B2* | 10/2019 | Ogrinz | H04L 43/0817 |
| 10,445,743 B2* | 10/2019 | Cheney | G06Q 30/06 |
| 10,594,796 B2* | 3/2020 | Verma | H04L 67/14 |
| 10,848,567 B1* | 11/2020 | Von Muenster | H04W 76/14 |
| 10,963,535 B2* | 3/2021 | Strange | H04L 67/02 |
| 10,977,639 B2* | 4/2021 | Massoudi | H04L 67/02 |
| 11,102,305 B2* | 8/2021 | Shukla | H04L 41/0668 |
| 11,199,837 B2* | 12/2021 | Cella | G06K 9/6262 |
| 2011/0022468 A1* | 1/2011 | Muster | G06Q 30/0261 705/14.58 |
| 2015/0121470 A1 | 4/2015 | Rongo et al. | |
| 2016/0335588 A1 | 11/2016 | Knobel | |
| 2016/0371630 A1 | 12/2016 | Jetcheva et al. | |
| 2018/0103039 A1 | 4/2018 | Thaler et al. | |
| 2018/0109650 A1 | 4/2018 | Berdy et al. | |
| 2018/0137457 A1 | 5/2018 | Sachs et al. | |
| 2018/0199386 A1 | 7/2018 | Yuan et al. | |
| 2018/0234294 A1 | 8/2018 | Wadekar et al. | |
| 2019/0044703 A1 | 2/2019 | Smith | |
| 2019/0089603 A1 | 3/2019 | Harat et al. | |
| 2019/0200405 A1 | 6/2019 | Gupta et al. | |
| 2019/0362608 A1* | 11/2019 | Horling | H05B 47/125 |
| 2020/0174869 A1* | 6/2020 | Chen | G06F 11/0736 |
| 2020/0348662 A1* | 11/2020 | Cella | G05B 13/028 |
| 2020/0357259 A1* | 11/2020 | Brady | H04L 67/12 |
| 2020/0365656 A1* | 11/2020 | Pillarisetty | H01L 27/2463 |
| 2021/0027485 A1* | 1/2021 | Zhang | G06V 10/82 |
| 2021/0144210 A1* | 5/2021 | Kolhapure | H04L 69/18 |
| 2021/0301985 A1* | 9/2021 | Brown | G06Q 10/20 |
| 2021/0336651 A1* | 10/2021 | Payton | G06F 21/606 |

FOREIGN PATENT DOCUMENTS

| | | |
|---|---|---|
| WO | WO 2002/054177 A2 | 7/2002 |
| WO | WO 2007/112413 A2 | 10/2007 |

OTHER PUBLICATIONS

Zhu et al.; "IOT Gateway: Bridging Wireless Sensor Networks into Internet of Things"; IEEE/IFIP Int'l Conf. on Embedded and Ubiquitous Computing; 2010; p. 347-352.

Chattopadhyay et al.; "Device Microagent for IoT Home Gateway—A Lighweight Plug-n-Play Architecture"; ACM SIGBED Review 15.2; 2018; p. 16-23.

Jie et al.; "Smart Home System based on IOT Technologies"; Int'l Conf. on Computational and Information Sciences; 2013; p. 1789-1791.

Liu et al.; "Approximating Optimal Spare Capacity Allocation by Successive Survivable Routing"; IEEE Transactions on Networking; vol. 13; 2005; 10 pages.

Park et al.; "A capacity planning model of unreliable multimedia service systems"; The Journal of Systems and Software; vol. 63; 2002; p. 69-76.

Zhou et al.; "Spare Capacity Planning Using Survivable Alternate Routing for Long-Haul WDM Networks"; Proceedings of the 7$^{th}$ Int'l Symposium on Computers and Communications; 2002; 7 pages.

Ghobadi et al.; "Optical Layer Failures in a Large Backbone"; IMC Proceedings on the Internet Measurement Conf.; 2016; 7 pages.

Crochat et al.; "Design Protection for WDM Optical Networks"; Swiss Federal Institute of Technology Lausanne; Communication Systems Division; Mar. 1997; 17 pages.

\* cited by examiner

PROPERTY ARCHIVIST ENABLED CUSTOMER SERVICE

BACKGROUND

In a world of ever increasing smart devices and smarter technologies, the internet of things (IoT) proposes that everyday objects and devices (e.g., light bulbs, washing machines and cameras) are to have an internet connection, where these objects are enabled to send or receive data to and from other devices, thus forming a larger network of connected things (e.g., objects or devices). The IoT promises smarter homes and work environments where all the objects are seamlessly connected and controlled for easier and more convenient operation.

This disclosure is directed to addressing issues in the existing technology. This background information is provided to reveal information believed by the applicant to be of possible relevance. No admission is necessarily intended, nor should be construed, that any of the preceding information constitutes prior art.

SUMMARY

Disclosed herein are methods, systems, and apparatuses for a property archivist that may enable automated customer service. For example, the disclosed subject matter may enable the servicing of products that a customer has at a location, such as a home or office. An electronic inventory may be automatically generated and used to assist in resolving customer service needs.

In an example, an apparatus may include a processor and a memory coupled with the processor that effectuates operations. The operations may include detecting a product; based on the detecting of the product, adding the product to a property archive, wherein the property archive comprises a profile for plurality of products at a location; obtaining an indication of a negative threshold alert status with the product; based on the indication of the negative threshold alert status, sending a service request associated with the product; based on the service request, determining the negative threshold alert status with the product and a resolution of the negative threshold alert status with the product; and based on the determined resolution, purchasing a part for the product and shipping the part for the product to a location of the product.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Disclosed herein are methods, systems, and apparatuses for a property archivist that may enable automated customer service. For example, the disclosed subject matter may enable the servicing of products that a customer has at a location, such as a home or office. An electronic inventory may be automatically generated and used to assist in resolving customer service needs.

Figure 1:
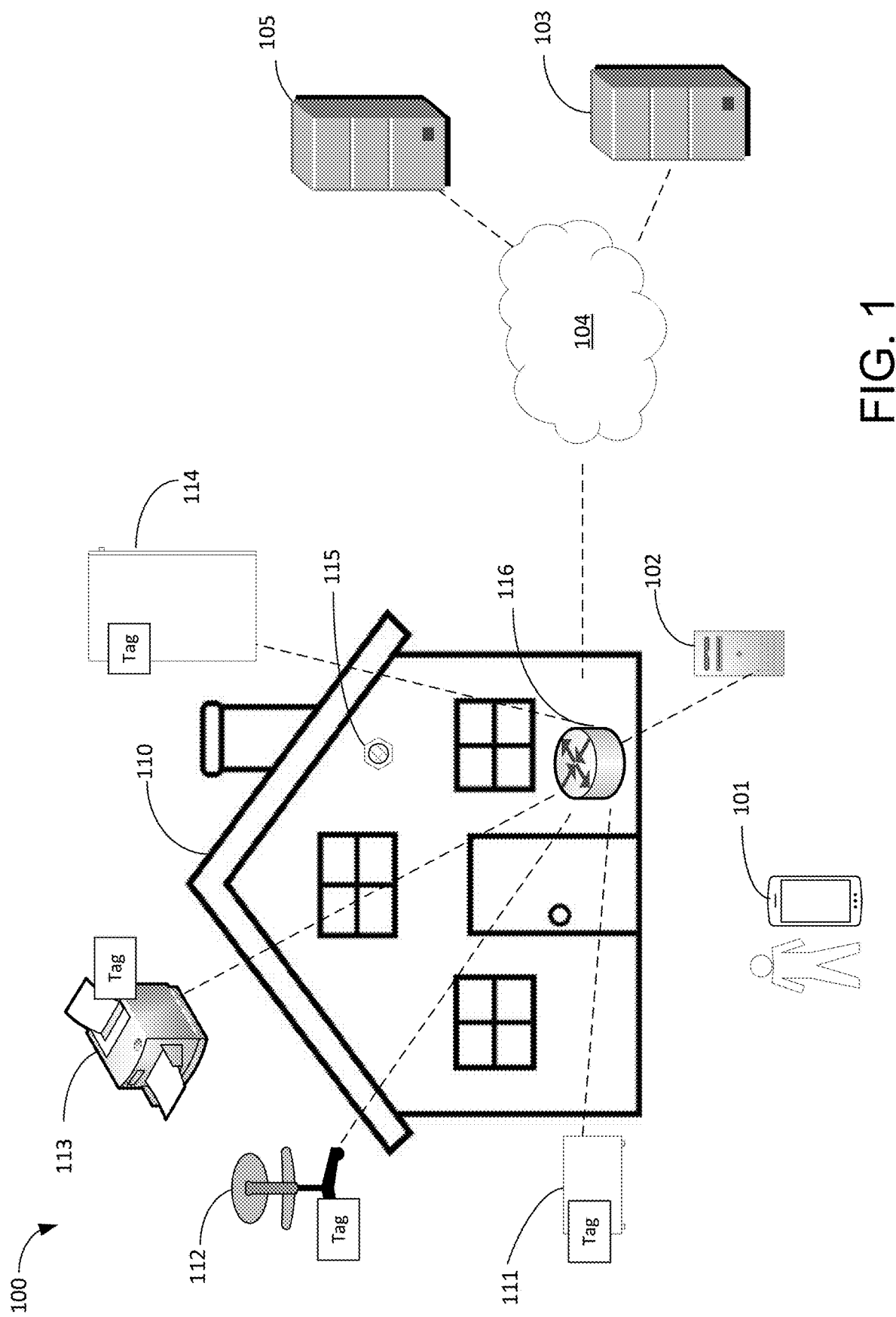
FIG. 1 illustrates an exemplary system associated with property archivist enabled customer service.

FIG. 1 illustrates an exemplary system associated with property archivist enabled customer service. System 100 may include multiple products (also referred herein as objects), such as mobile device 101, AC unit 111, office chair 112, printer 113, appliance 114, sensor 115, or server 102 that may be communicatively connected with each other, using wireless, wireline, or network 104. Server 102 may manage the property at a domain (which may include a location), such as home 110. The domain may be associated with a user, a location, or combination. For example, there may be multiple users in home 110 and therefore multiple property archives at the same location. Location may be narrowed to parts of a location, such as home-kitchen or home-garage. Domain may be narrowed as well to home-garage-Sarah or home-garage-Jim.

With continued reference to FIG. 1, server 102 may also be communicatively connected with server 103. Server 103 may be used to manage customer service issues and be located remotely. It is contemplated herein that the functions of server 102 and server 103 may be combined into one device or distributed over multiple devices. Mobile device 101 may include, wireless devices, such as satellite communication systems, portable digital assistants (PDAs), laptop computers, tablet devices, smart phones, smart watches, smart speakers, automobiles (e.g., autonomous vehicles), augmented reality devices, virtual reality devices, virtual assistants, or the like. Appliance 114 may include ranges, wall ovens, refrigerators, dishwashers, washing machines, dryers, smart bulbs, or coffee makers Sensor 115 may include an environmental sensor, acoustic sensor, sound sensor, vibration sensor, fluid sensor, optical sensor, position sensor (e.g., accelerometer or gyroscope), speed sensor, chemical sensor, pressure sensor, camera, or the like. Sensor 115 may be substantially integrated into an object (e.g., appliance 114 or printer 111) or may be a stand-alone device.

Figure 2:
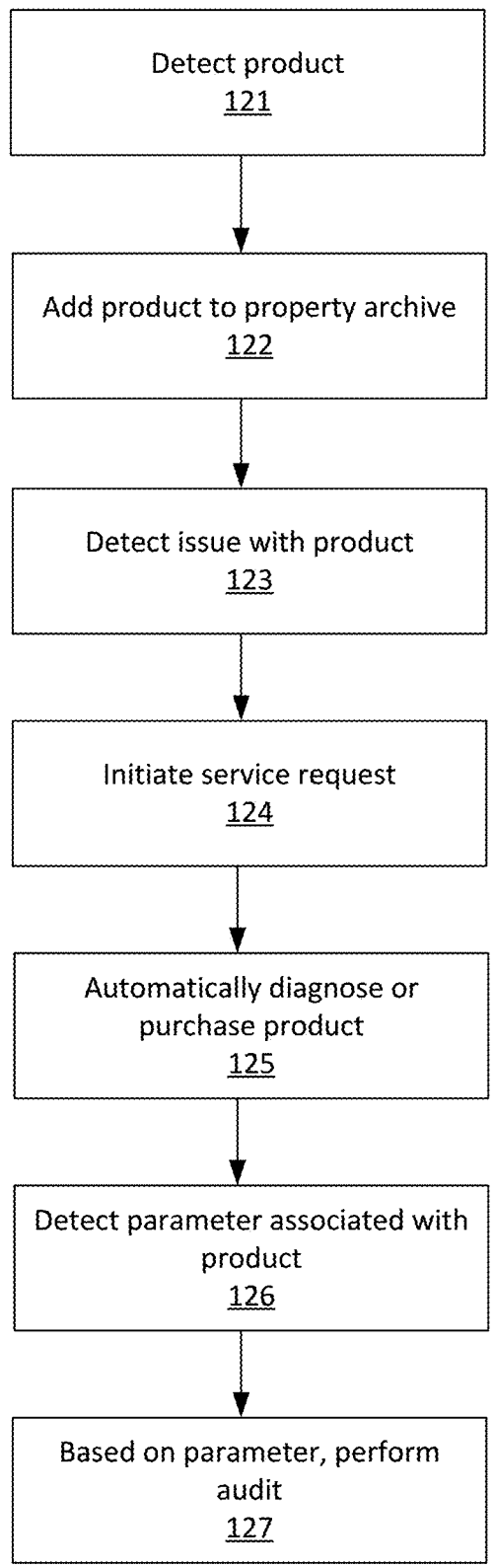
FIG. 2 illustrates an exemplary method associated with property archivist enabled customer service.

FIG. 2 illustrates an exemplary method associated with property archivist enabled customer service. Appliance 114 may be introduced to a physical environment, such home 110. At step 121, appliance 114 may be detected. For example, appliance 114 may be a refrigerator. Appliance 114 may be equipped with the following: an electronic tag that includes a power source such as a battery, a datastore containing product information, or wireless connection capability for a local area network (LAN) or personal area network (PAN), such as Wi-Fi or Bluetooth network. The tag may be attached to appliance 114 itself or packaging of appliance 114. Products may include non-electronic centric items, such as office chair 112. In an example, appliance 114 may be detected after powering on based on a tag (e.g., beacon) within appliance 114. The capabilities of the tag may be embedded within a product itself if the product is electronic in nature, such as a television, HVAC compressor, or a refrigerator. In another example, appliance 114 may include a code (e.g., barcode or QR code) of the tag that may be read by an external device (e.g., camera or barcode reader).

At step 122, based on the detection of step 121, appliance 114 may be added to a property archive of server 102. The property archive of server 102 may already include profiles of printer 113, office chair 112, or AC unit 111. A property archive may include information as shown in Table 1 or the like. For example, the property archive not only will provide an indication of products within a domain (e.g., a location— home 110), but also detailed product information (as provided in more detail below), usage information over a period, and alert status (e.g., a problem that is affecting the operation or use of appliance 114).

TABLE 1

| Product | Refrigerator | Printer | Office Chair |
|---|---|---|---|
| Product Information 1 | Domain - Home | Domain - Home | Domain - Home |
| Usage Information 1 | In Use Now | Last Use: 2:55 PM | Last Use: 3:22 PM |
| Alert Status 1 | Optimal | Average | Needs Attention (service requested) |

With continued reference to FIG. 2 and step 122, when appliance 114 is brought within proximity (e.g., about 100 feet or less) of wireless router 116, sensor 115, mobile device 101, or beacon, the tag of appliance 114 may be detected. A message may be sent from wireless router 116, sensor 115, mobile device 101 to a property archivist application that may be operating on server 101 or elsewhere over a network (e.g., mobile device 104). The message sent to server 102 may include product information received from the product tag, which may be used to create a profile for appliance 114. The product information may include data such as the product name, product number, serial number, manufacture data, warranty expiration date, price paid, product photo, manufacturer name, seller name, date of manufacture, date of first use in service at any location, date of first use of service at a particular location, initial geographical coordinate position, position in or around a facility (e.g., home or business facility), general time of use, time of use in different modes (e.g., color cycle or whites cycle for a washer), features, or other data. The product information may be from a remote server, such as server 105. Server 105 may be associated with an online seller of products. In an example scenario, appliance 114 may be purchased from an online seller, product information may be pre-downloaded to server 102 (e.g., before appliance 114 arrives at home 110), a profile may be created for appliance 114, and there may be relatively simple activation of the already created profile after appliance 114 is detected at home 110.

With continued reference to FIG. 2 and step 122, a message may be shown on mobile device 101 that informs (or requests) of the addition of appliance 114 to the property archive of server 102. Again, it is contemplated that mobile device 101 may house its own property archive. For instance, mobile device 101 may be a smart speaker that speaks to the user: "I found a new refrigerator—would you like me to add it to your property archive?" Alternatively (or in addition to), the prompt may be via a visual display on mobile device 101. A user may need to accept the data for appliance 114, or appliance 114 may be added automatically based on predetermined parameters, such as time, date, location (e.g., inside versus outside home 110), tag matching code provided by online seller, type of product, or other settings set by user or online seller. When the data for appliance 114 is added to the property archive, there may be an indication of the time and date added.

Once data is stored in the product archive, a product registration may be initiated with an online seller or with the product manufacturer, including customer information that is also stored in the property archive.

At step 123, a negative threshold alert status with appliance 114 may be detected. As shown in Table 1, each product may be assigned a status. The status may include different levels such as optimal (e.g., no assistance needed), average (e.g., acceptable and no immediate assistance needed), or needs attention (e.g., immediate assistance needed), among other statuses. A threshold alert may be associated with sub-optimal operation or significant aesthetic issues. In an example, appliance 114 (e.g., an HVAC system or refrigerator) may detect a low level of operating efficiency, run a self-diagnosis, and determine that a part is faulty. In another example, sensor 115 (e.g., a camera) may detect, based on object recognition, that appliance 114 has a handle missing, a door missing, or some other anomaly. The anomaly may be based on comparing a photo (or previous camera video capture) of appliance 114 and a current camera capture (sensor 115) of appliance 114. Sensor 115 may report motion or noise. Sensor 115 may be a camera that detects motion, noise, interactions, or the like. The use of a camera may be helpful when appliance 114 is not communicatively connected with a network, but sensor 115 has the ability to provide some or all of the information that should be provided to server 102 or other apparatuses. Alternatively, a virtual assistant (or camera) may overhear a person speak "the refrigerator is running hot," which may be proof of a negative threshold alert status or may cause a diagnostic to be run to determine if there is a problem with appliance 114.

At step 124, based on the negative threshold alert status of step 123, initiating a service request for the product. The service request may be a request for server 103 to diagnose the cause of the negative threshold alert status. This request may go to server 103, which may review the property archive to retrieve a customer service address associated with appliance 114. For instance, server 103 may be a customer service server dedicated to appliance 114 (e.g., online seller or brand owner of appliance 114). Server 102 or mobile device 101 may send the request to server 103.

At step 125, based on the request of step 124, server 103 may automatically diagnose the negative threshold alert status. And based on the diagnosis, a secondary product may be automatically purchased by server 103 to resolve the negative threshold alert. Server 103 may initiate a remote diagnostics session based on information from appliance 114, server 102, or sensor 115, among other objects of home 110. The diagnosis may be sent to a display of mobile device 101 or a display associated with a customer service representative for resolution. Resolution may include software changes to appliance 114, part replacement of appliance 114, replacement of appliance 114, or re-configuration of appliance 114, among other things. Based on the diagnosis and user profile associated with the location, user of mobile device 101, or appliance 114, sever 103 (or appliance 114, server 102, or mobile device 101) may initiate the purchase of a replacement part. In a case such as this where there is an automatic purchase of an item by an apparatus (e.g., server 103), the apparatus should be assigned "purchasing authority," which may be by the user of mobile device 101, an online seller, or some other authority. This authorization may be stored as data for appliance 114 in its property archive entry (e.g., profile). This purchasing authority may be set when appliance 114 is introduced to home 110. For instance, when appliance 114 is introduced, the user may authorize appliance 114 (or other apparatuses) to order parts for appliance 114 or a replacement product. The parts, for example, may include ink cartridges, filters, wheels, coolant, or paper, among other parts.

The property archive is disclosed in more detail below. The property archive data may be stored such that some of the data is publicly-accessible by trusted 3rd parties. These may be parties that assist with the resolution of the customer service need. The trusted 3rd party may access the public property archive data to determine if replacement parts are needed, for example. An end user or online seller may also choose to make this public property archive data accessible to advertisers in exchange for some value (e.g., discount on service or other monetary value) to the user.

From time to time, it may be necessary for the property archive to be audited to ensure that is has an accurate listing of products. This may be used to detect items that need to be added or deleted from the property archive. Audits may be self-initiated by server 102, server 103, or mobile device 101 based on a parameter, such as a request by user of mobile device 101, a time, a date, a number of detected within a period, a number of added or deleted products from the property archive, proximity of the same type of device at a location within home 110, or a change of location of a threshold number of products, among other things. For the audit, a property archive application may send a ping message to each of the items in its archive (e.g., property archive for home 110). The audit may be managed based on information from a router or other apparatus. Server 102 may obtain information from multiple products or objects (e.g., router 116). In an example, router 116 may also have knowledge of other products that are connected to a network of home 110, but are not in the property archive. The results of the audit may be presented to a display associated with mobile device 101, server 102, server 103, or the like. The results may provide suggested corrections or alterations to appliance 114 or other products in home 110.

Objects that are contemplated and not shown may include shoes, clothing, dishware, furniture, or the like. It is contemplated that objects may be embedded with a sensor or code (e.g., QR code) that may be sensed by a device. It is contemplated that similar to facial recognition, video, audio, or photo recognition of a product may be used to identify product information or diagnose issues, as disclosed herein.

Figure 3:
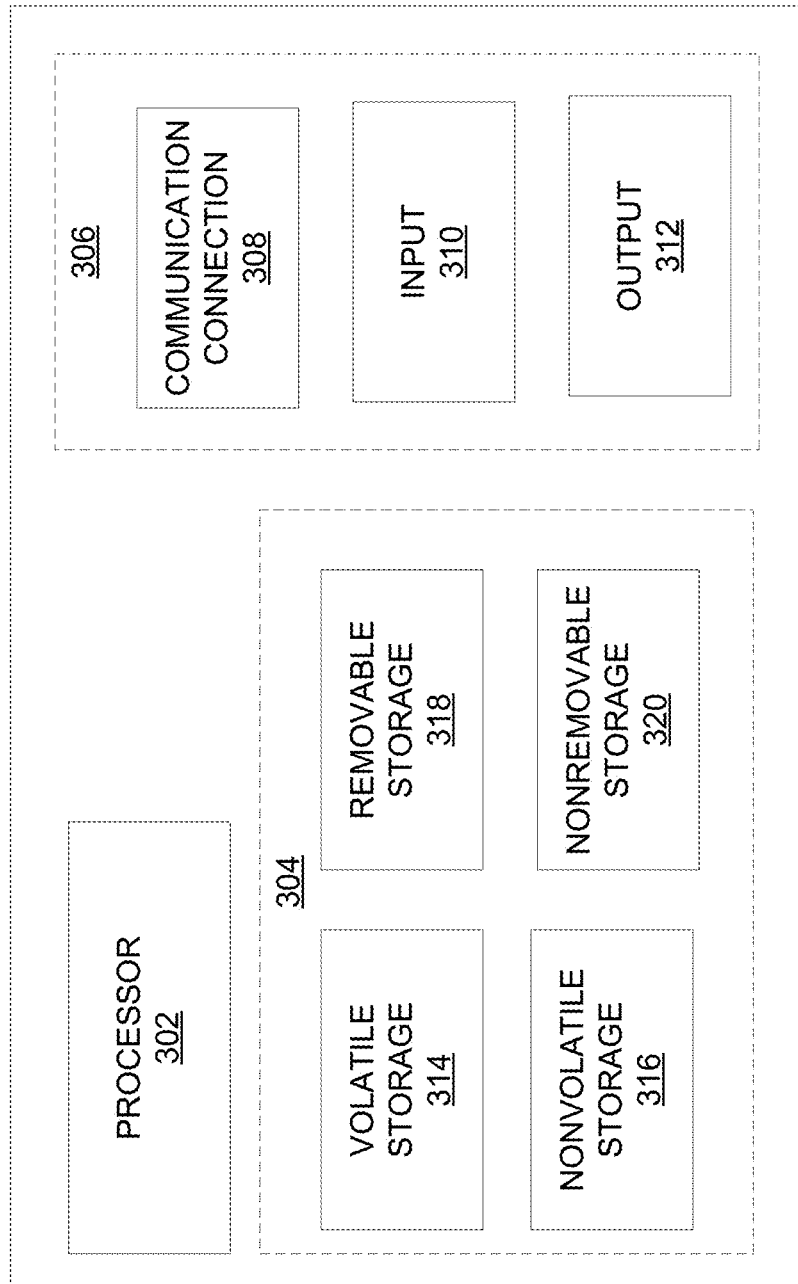
FIG. 3 illustrates a schematic of an exemplary network device.

FIG. 3 is a block diagram of network device 300 that may be connected to or comprise a component of system 100 of FIG. 1. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
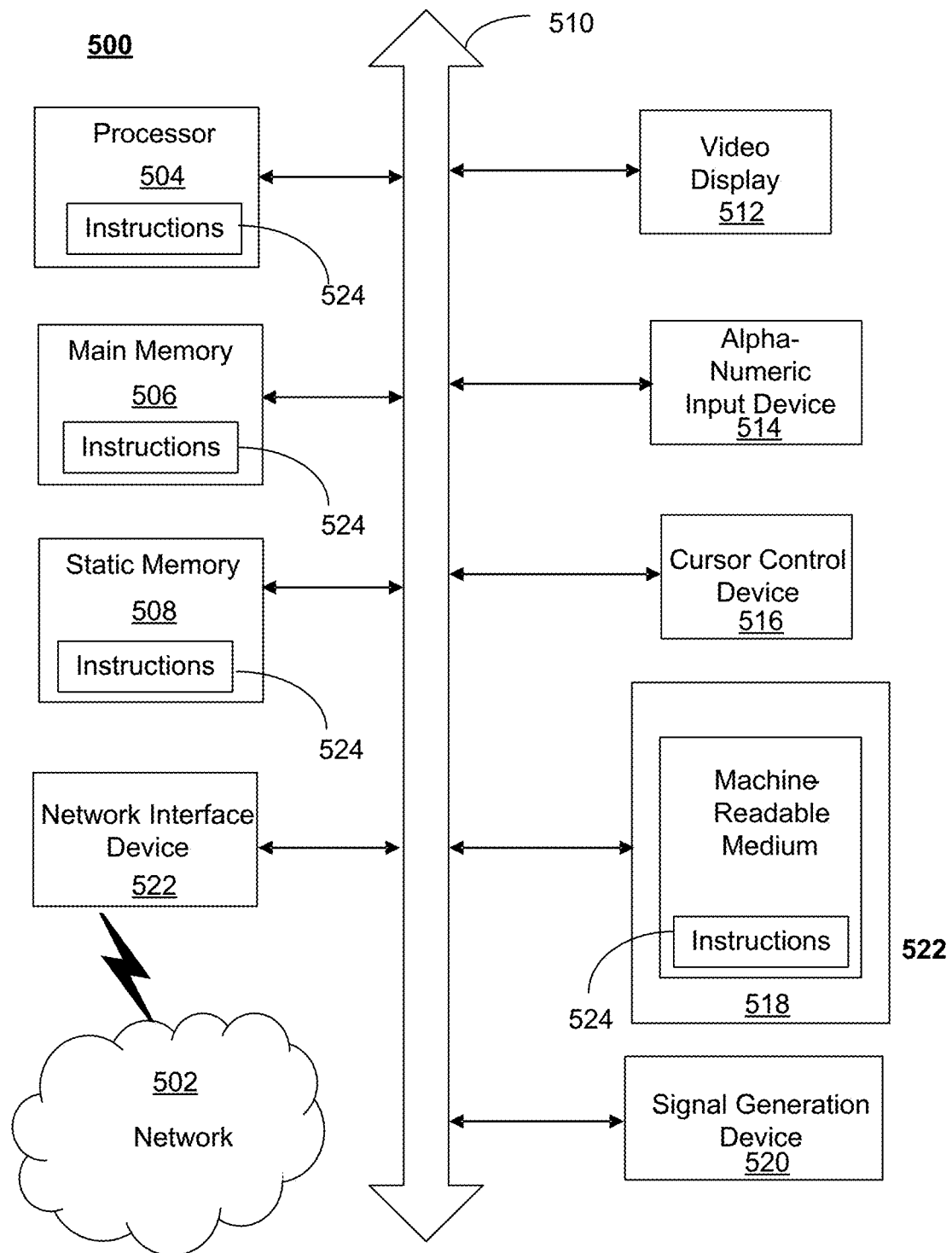
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described herein with regard to property archivist enabled customer service. One or more instances of the machine can operate, for example, as processor 302, mobile device 101, server 102, server 103, appliance 114, printer 113, server 105, and other apparatuses of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

For the subject matter described herein, a telecommunications system may utilize a software defined network (SDN). A SDN may help provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which property archivist enabled customer service can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—property archivist enabled customer service—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for managing or operating a property archivist system. A method, system, computer readable storage medium, or apparatus may provide for detecting a product; based on the detecting of the product, adding the product to a property archive, wherein the property archive comprises a profile for plurality of products at a location; obtaining an indication of a negative threshold alert status with the product; based on the indication of the negative threshold alert status, sending a service request associated with the product; based on the service request, determining a reason (e.g., source) for the negative threshold alert status with the product and a possible resolution of the negative threshold alert status with the product; and based on the determined resolution, purchasing a part of the product and shipping the part of the product to a location of the product. A method, system, computer readable storage medium, or apparatus may provide for detecting a product at a location; based on the detecting of the product, adding a profile of the product to a property archive; obtaining an indication of a negative threshold alert status associated with the product; based on the indication of the negative threshold alert status, sending a service request associated with the product. The method, system, computer readable storage medium, or apparatus may provide for, based on the service request, determining a source of the negative threshold alert status with the product and a resolution of the negative threshold alert status with the product. The method, system, computer readable storage medium, or apparatus may provide for, based on the determined resolution, shipping a part of the product to the location of the product. The negative threshold alert status may be based on detecting an abnormality of the product by comparing a first photo of the product at a first period to a second photo of the product at a second period. The detecting of the product at the location may be based on object recognition. The method, system, computer readable storage medium, or apparatus may provide instructions to purchase a part for the product. The profile of the product may include product information, wherein the product information may include usage data of the product over a period, manufacture data, or warranty expiration date, among other things. The detecting of the product may be based on an electronic tag of the product that is communicatively connected with an apparatus. The negative threshold alert status may be based on detecting an abnormality of the product based on object recognition. The property archive may include a plurality of profiles for the products at the location. The method, system, computer readable storage medium, or apparatus may provide for determining that the property archive should delete the profile of the product based on the location of the product. The apparatus may be a mobile device. The added profile of the product may be sent to a mobile device to update a property archive of the mobile device. All combinations in this paragraph (including the removal or addition of steps) are contemplated in a manner that is consistent with the other portions of the detailed description.

What is claimed:

1. An apparatus comprising:
   a processor; and
   a memory coupled with the processor, the memory storing executable instructions that when executed by the processor cause the processor to effectuate operations comprising:
      accessing a property archive for a plurality of products used by a user at a location of the user, the property archive storing respective profiles for respective products of the plurality of products, each respective profile storing usage information about usage of a respective product by the user over a time period and information about a current functional status of the respective product for current usage by the user;
      detecting a product of the user at the location;
      based on the detecting of the product, automatically adding a profile of the product to the property archive;
      obtaining an indication of a negative threshold alert status associated with the product, wherein the indication of a negative threshold alert status is based on the information about the current functional status of the respective product for current usage by the user;
      based on the indication of the negative threshold alert status, sending a service request associated with the product;
      based on the service request, automatically determining a source of the negative threshold alert status with the product and a determined resolution of the negative threshold alert status with the product; and
      based on the determined resolution, shipping a part for the product to the location of the product.

2. The apparatus of claim 1, wherein the negative threshold alert status is based on detecting an abnormality of the product by comparing a first photo of the product at a first period to a second photo of the product at a second period.

3. The apparatus of claim 1, wherein the detecting of the product at the location is based on object recognition.

4. The apparatus of claim 1, the operations further comprising providing instructions to purchase the part for the product.

5. The apparatus of claim 1, wherein the profile of the product comprises product information, wherein the product information comprises usage data of the product, manufacture data, or a warranty expiration date.

6. The apparatus of claim 1, wherein the detecting of the product is based on an electronic tag of the product that is communicatively connected with the apparatus.

7. The apparatus of claim 1, wherein the negative threshold alert status is based on detecting an abnormality of the product based on object recognition.

8. The apparatus of claim 1, the operations further comprising determining that the property archive should delete the profile of the product based on the location of the product.

9. The apparatus of claim 1, wherein the apparatus is a mobile device.

10. The apparatus of claim 1, wherein the profile of the product is sent to a mobile device to update a property archive of the mobile device.

11. A system comprising:
a product comprising an electronic tag; and
an apparatus communicatively connected with the product, the apparatus comprising:
a processor; and
a memory coupled with the processor, the memory storing executable instructions that when executed by the processor cause the processor to effectuate operations comprising:
accessing a property archive for a plurality of products including the product used by a user at a location of the user, the property archive storing respective profiles for respective products of the plurality of products, each respective profile including usage information about usage of a respective product by the user over a time period and information about a functional status of the respective product for usage by the user;
detecting the product at the location;
based on the detecting of the product, automatically adding a profile of the product to the property archive;
obtaining an indication of a negative threshold alert status associated with the product, wherein the indication of a negative threshold alert status is based on the information about the functional status of the respective product for usage by the user;
based on the indication of the negative threshold alert status, sending a service request associated with the product;
based on the service request, automatically determining a source of the negative threshold alert status with the product and a determined resolution of the negative threshold alert status with the product; and
based on the determined resolution, shipping a part for the product to the location of the product.

12. The system of claim 11, wherein the negative threshold alert status is based on detecting an abnormality of the product by comparing a first photo of the product at a first period to a second photo of the product at a second period.

13. The system of claim 11, wherein the detecting of the product at the location is based on object recognition.

14. The system of claim 11, the operations further comprising providing instructions to purchase the part for the product.

15. The system of claim 11, the operations further comprising determining that the property archive should delete the profile of the product based on the location of the product.

16. The system of claim 11, wherein the profile of the product is sent to a mobile device to update a property archive of the mobile device.

17. A non-transitory computer readable storage medium storing computer executable instructions that when executed by a computing device cause said computing device to effectuate operations comprising:
accessing a property archive for a plurality of products used by a user at a location of the user, the property archive storing respective profiles for respective products of the plurality of products, each respective profile storing usage information about usage of a respective product by the user over a time period and information about a current functional status of the respective product for current usage by the user;
detecting a product of the user at the location;
based on the detecting of the product, automatically adding a profile of the product to the property archive;
obtaining an indication of a negative threshold alert status associated with the product, wherein the indication of a negative threshold alert status is based on the information about the current functional status of the respective product for current usage by the user;
based on the indication of the negative threshold alert status, sending a service request associated with the product;
based on the service request, automatically determining a source of the negative threshold alert status with the product and a determined resolution of the negative threshold alert status with the product; and
based on the determined resolution, shipping a part for the product to the location of the product.

18. The non-transitory computer readable storage medium of claim 17, wherein the negative threshold alert status is based on detecting an abnormality of the product by comparing a first photo of the product at a first period to a second photo of the product at a second period.

19. The non-transitory computer readable storage medium of claim 17, wherein the detecting of the product at the location is based on object recognition.

20. The non-transitory computer readable storage medium of claim 17, the operations further comprising providing instructions to purchase the part for the product.

* * * * *